United States Patent
Wänstedt et al.

(10) Patent No.: US 10,866,595 B2
(45) Date of Patent: *Dec. 15, 2020

(54) ADJUSTMENT OF PLANNED MOVEMENT BASED ON RADIO NETWORK CONDITIONS

(71) Applicant: Telefonaktiebolaget LM Ericsson (PUBL), Stockholm (SE)

(72) Inventors: Stefan Wänstedt, Luleå (SE); Tommy Arngren, Södra Sunderbyn (SE); Tomas Jönsson, Luleå (SE); Peter Ökvist, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 163 days.

This patent is subject to a terminal disclaimer.

(21) Appl. No.: 15/891,520

(22) Filed: Feb. 8, 2018

(65) Prior Publication Data
US 2018/0164805 A1 Jun. 14, 2018

Related U.S. Application Data

(63) Continuation of application No. 15/305,229, filed as application No. PCT/SE2015/051335 on Dec. 14, 2015, now Pat. No. 9,927,808.

(51) Int. Cl.
*G05D 1/10* (2006.01)
*B64C 39/02* (2006.01)
(Continued)

(52) U.S. Cl.
CPC ............ *G05D 1/101* (2013.01); *B64C 39/024* (2013.01); *G01C 21/00* (2013.01);
(Continued)

(58) Field of Classification Search
CPC combination set(s) only.
See application file for complete search history.

(56) References Cited

U.S. PATENT DOCUMENTS 6,266,514 B1 * 7/2001 O'Donnell ............ H04W 16/18
455/67.13
6,336,035 B1 * 1/2002 Somoza ................ H04W 16/18
455/423
(Continued)

FOREIGN PATENT DOCUMENTS

EP    1847896    10/2007
EP    1873606    1/2008
(Continued)

OTHER PUBLICATIONS

International Search Report and Written Opinion issued in corresponding International application No. PCT/SE2015/051335, dated Jul. 29, 2016, 9 pages.
(Continued)

*Primary Examiner* — Rami Khatib
(74) *Attorney, Agent, or Firm* — Rothwell, Figg, Ernst & Manbeck, P. C.

(57) ABSTRACT

A movement adjusting device adjusts the movement of a transceiver moving according to a plan along a route through a communication network while communicating for an application having a service requirement on the communication network, the communication network comprises cells and the movement adjusting device is operative to: obtain radio network condition data regarding a group of cells comprising a current cell in which the transceiver is located and a number of neighbouring cells into which the transceiver may move, analyse the radio network condition data with regard to fulfilling the service requirement of the application, and make an adjustment of the planned movement if the analysis indicates that this would improve on the fulfilling of the service requirement.

20 Claims, 5 Drawing Sheets

(51) Int. Cl.

| | | |
|---|---|---|
| *G01C 21/00* | (2006.01) | |
| *G01C 21/34* | (2006.01) | |
| *G05D 1/00* | (2006.01) | |
| *G07C 5/00* | (2006.01) | |
| *G08G 5/00* | (2006.01) | |
| *H04W 24/02* | (2009.01) | |
| *H04W 36/22* | (2009.01) | |
| *H04W 36/00* | (2009.01) | |

(52) U.S. Cl.
CPC ....... *G01C 21/3461* (2013.01); *G05D 1/0022* (2013.01); *G07C 5/008* (2013.01); *G08G 5/0069* (2013.01); *H04W 24/02* (2013.01); *H04W 36/22* (2013.01); *B64C 2201/141* (2013.01); *B64C 2201/146* (2013.01); *H04W 36/0083* (2013.01)

(56) References Cited

U.S. PATENT DOCUMENTS

| | | | | |
|---|---|---|---|---|
| 7,072,311 | B1* | 7/2006 | Czaja | H04W 36/14 |
| | | | | 370/318 |
| 7,158,790 | B1* | 1/2007 | Elliott | H04W 16/00 |
| | | | | 455/446 |
| 7,925,436 | B2* | 4/2011 | Blackwood | G01C 21/26 |
| | | | | 340/995.12 |
| 8,295,853 | B2* | 10/2012 | Heikkila | G01S 5/0018 |
| | | | | 455/422.1 |
| 8,314,683 | B2* | 11/2012 | Pfeffer | G08B 25/006 |
| | | | | 340/7.3 |
| 9,467,845 | B1* | 10/2016 | Rastogi | H04W 8/14 |
| 2004/0203998 | A1* | 10/2004 | Knauerhase | H04W 36/32 |
| | | | | 455/550.1 |
| 2006/0105759 | A1* | 5/2006 | Betge-Brezetz | H04W 24/00 |
| | | | | 455/422.1 |
| 2006/0259236 | A1* | 11/2006 | Kaplan | G01C 21/26 |
| | | | | 701/532 |
| 2007/0213925 | A1* | 9/2007 | Sharma | G01C 21/3461 |
| | | | | 455/456.1 |
| 2008/0113683 | A1* | 5/2008 | Paas | H04M 1/72519 |
| | | | | 455/552.1 |
| 2008/0167078 | A1* | 7/2008 | Eibye | H04M 1/72522 |
| | | | | 455/566 |
| 2012/0143499 | A1* | 6/2012 | Petersen | G01C 21/28 |
| | | | | 701/450 |
| 2014/0057626 | A1* | 2/2014 | Uelk | H04W 24/00 |
| | | | | 455/423 |
| 2014/0142787 | A1 | 5/2014 | Tillotson et al. | |
| 2015/0336669 | A1 | 11/2015 | Kantor et al. | |

FOREIGN PATENT DOCUMENTS

| | | |
|---|---|---|
| EP | 2840836 | 2/2015 |
| KR | 20100092656 | 8/2010 |
| WO | 2012/118414 | 9/2012 |
| WO | 2015/115037 | 8/2015 |

OTHER PUBLICATIONS

Notice of Preliminary Rejection issued by Korean Intellectual Property Office in Korean Application No. 2016-7033448, dated Jun. 15, 2017, 4 pages.

European Search Report issued in Application No. EP15889430.3 dated Mar. 8, 2017, 8 pages.

Lin, C.-C. et al., "Moving camera analytics: Emerging scenarios, challenges, and applications," IBM J. Res. & Dev. vol. 59 No. 2/3 Paper 5 Mar./May 2015, pp. 5:1-5:10.

* cited by examiner

ADJUSTMENT OF PLANNED MOVEMENT BASED ON RADIO NETWORK CONDITIONS

CROSS-REFERENCE TO RELATED APPLICATIONS

This is a continuation of U.S. application Ser. No. 15/305,229, having a section 371(c) date of Oct. 19, 2016 (which published as US 2017/0168480), which is a national stage of International Patent Application No. PCT/SE2015/051335, filed Dec. 14, 2015, designating the United States. The above identified applications and publication are incorporated by this reference.

TECHNICAL FIELD

The invention relates to a wireless terminal travelling through a wireless communication system. More particularly, the invention relates to a movement adjustment device, method, computer program and computer program product for adjusting a movement of a wireless transceiver moving according to a plan along a route through a wireless communication network.

BACKGROUND

Unmanned vessels, such as vehicles like cars and trucks, and aerial ones like drones, are dependent on connectivity primarily for monitoring and control. A type of unmanned aerial vehicle, autonomous vehicles moving over large distances are, even if they manage basic mobility, dependent on cellular access for security, remote control purposes and to continuously transfer recorded data, e.g. locations, status of engine and/or battery, images or video, to some central location.

One particularly interesting group of such vehicles is the Unmanned Aerial Vehicle (UAV). There is a growing interest for UAVs like from high-profile business cases—such as for delivery of consumer products, such as books, gadgets and soft drinks and even hot food like pizza. However, there are also everyday use cases that extend from filmmaking and aerial photography to fields such as real estate, farming and pipeline maintenance. Journalists want to work with them. As do meteorologists. Also, consumers may use UAVs to take amazing vacation pictures.

State of the art manually operated drones like Parrot Bebop or Phantom Dji 2 Vision have a range of 400 m to 2 km (Open Area). This makes it impossible for one operator to remotely control more than one drone at the time and the range is limited to the range of the radio transmitter.

Multiple drones moving over larger areas with the purpose of delivery services will be dependent on wide area radio access for security, safety and remote operation purposes. The drone will thus carry a wireless transceiver that is carried through the coverage area of a wireless communication network.

Such moving wireless transceivers that provide services live video and metadata, to for instance a remote operations centre, for the applications related to agriculture, public safety, oil and gas exploration, etc., may put high requirements on the radio network performance of the wireless communication network.

In a scenario where a moving wireless transceiver passes through a cell of the wireless communication network during which it transmits, e.g. high definition real time video, the wireless transceiver will put significant load onto the cell at question. If the cell already before entrance of the wireless transceiver is highly loaded, both radio network key performance indexes (KPIs) and a video quality measure of the video will suffer.

In a further scenario where a multitude of moving wireless transceivers supplying high-definition-video frequently pass through a cell, that content traffic itself can deplete a large portion of the cellular capacity in a given area.

It would therefore be suitable if a vessel carrying a wireless transceiver could adapt its mission path with respect not only to the fulfilling of the service KPI, but also to avoid burdening a part of the wireless communication network already having a high load.

SUMMARY

The invention is therefore directed towards improving on the fulfilling of a service requirement while at the same time avoiding placing an undue burden on the wireless communication network.

This object is according to a first aspect achieved by a movement adjustment device for adjusting a movement of a wireless transceiver. The transceiver is moving according to a plan along a route through a wireless communication network while at the same time communicating for an application having a service requirement on the wireless communication network. The wireless communication network in turn comprises cells. The movement adjusting device comprises a processor acting on computer instructions whereby the movement adjusting device is configured to: obtain radio network condition data regarding a group of cells, where this group comprises a current cell in which the wireless transceiver is located and a number of neighbouring cells into which the wireless transceiver may move, analyse the radio network condition data with regard to fulfilling the service requirement of the application, and make an adjustment of the planned movement if the analysis indicates that this would improve on the fulfilling of the service requirement.

The object is according to a second aspect achieved through a method of adjusting the movement of a wireless transceiver. The transceiver is moving according to a plan along a route through a wireless communication network while at the same time communicating for an application having a service requirement on the wireless communication network. The wireless communication network comprises cells and the method is performed in a movement adjusting device. The method comprises: obtaining radio network condition data regarding a group of cells, where this group comprises a current cell in which the wireless transceiver is located and a number of neighbouring cells into which the wireless transceiver may move, analysing the radio network condition data with regard to fulfilling the service requirement of the application, and making an adjustment of the planned movement if the analysis indicates that this would improve on the fulfilling of the service requirement.

The object is according to a third aspect achieved through a movement adjustment device for adjusting a movement of a wireless transceiver. The transceiver is moving according to a plan along a route through a wireless communication network while at the same time communicating for an application having a service requirement on the wireless communication network. The wireless communication network in turn comprises cells.

The movement adjusting device comprises: means for obtaining radio network condition data regarding a group of cells comprising a current cell in which the wireless transceiver is located and a number of neighbouring cells into which the wireless transceiver may move, means for analysing the radio network condition data with regard to fulfilling the service requirement of the application, and means for making an adjustment of the planned movement if the analysis indicates that this would improve on the fulfilling of the service requirement.

The object is according to a fourth aspect achieved through a computer program for adjusting a movement of a wireless transceiver. The transceiver is moving according to a plan along a route through a wireless communication network while at the same time communicating for an application having a service requirement on the wireless communication network. The wireless communication network in turn comprises cells. The computer program comprises computer program code which when run in a movement adjusting device, causes the movement adjusting device to: obtain radio network condition data regarding a group of cells comprising a current cell in which the wireless transceiver is located and a number of neighbouring cells into which the wireless transceiver may move, analyse the radio network condition data with regard to fulfilling the service requirement of the application, and make an adjustment of the planned movement if the analysis indicates that this would improve on the fulfilling of the service requirement.

The object is according to a fifth aspect achieved through a computer program product for adjusting a movement of a wireless transceiver moving according to a plan along a route through a wireless communication network. The computer program comprises a data medium with computer program code according to the fourth aspect.

The radio network condition data may comprise cell load data for at least the neighbouring cells.

In a first variation of the first aspect, when analysing the radio network condition data the movement adjustment device may in this case be configured to is operative to evaluate the cell loads defined in the cell load data with regard to fulfilling the service requirement and when adjusting planned movement is configured to adjust the planned movement so that the cell load along the route after the current cell is lower after the adjustment than before the adjustment.

In a corresponding variation of the second aspect the analysing of the radio network condition data may comprise evaluating the cell loads defined in the cell load data with regard to fulfilling the service requirement and the making of an adjustment of planned movement comprises adjusting the planned movement so that the cell load along the route after the current cell is lower after the adjustment than before the adjustment.

The radio network condition data may comprise data concerning radio link quality between the cells and the wireless transceiver.

In a second variation of the first aspect, the movement adjusting device is, when obtaining radio network condition data, further configured to determine cell load estimates for the neighbouring cells based on the radio link quality data and a cell geometry measure, where the cell geometry measure of a cell is based on a signal strength of the cell as detected by the wireless transceiver divided by corresponding signal strengths of the other cells of the group and the cell load estimates are provided as the cell load data.

In a corresponding variation of the second aspect, the obtaining of radio network condition data comprises determining cell load estimates for the neighbouring cells based on the radio link quality data and a cell geometry measure, where the cell geometry measure of a cell is based on a signal strength of the cell as detected by the wireless transceiver divided by corresponding signal strengths of the other cells of the group and the cell load estimates being provided as the cell load data.

In a third variation of the first aspect, the movement adjusting device is further configured to, when obtaining radio network condition data, estimate the loads of the neighbouring cells based on responses to requests for resources sent from the wireless transceiver to the neighbouring cells and provide the load estimations as the cell load data.

In a corresponding variation of the second aspect, the obtaining of radio network condition data comprises estimating the loads of the neighbouring cells based on responses to requests for resources sent from the wireless transceiver to the neighbouring cells and providing the load estimations as the cell load data.

In a fourth variation of the first and second aspect, the adjustment of the planned movement is a change of the cells that the route passes. The change of cells may comprise a change in a vertical direction.

In a fifth variation of the first and second aspects the adjustment of planned movement is based on mission constraints of a mission in which the application is operated.

In a sixth variation of the first and second aspects the radio network condition data comprises statistical cell load data.

In a seventh variation of the first aspect, the movement adjustment device, when making an adjustment of the planned movement is further configured to adjust the speed with which the wireless transceiver moves for changing the time at which a cell is passed in the route.

In a corresponding variation of the second aspect, the making of an adjustment of the planned movement comprises adjusting the speed with which the wireless transceiver moves for changing the time at which a cell is passed in the route.

In an eighth variation of the first aspect, the movement adjustment device is further configured to change the service requirement if it cannot be fulfilled with any movement, changed or unchanged.

In a corresponding variation of the second aspect, the method further comprises changing the service requirement if it cannot be fulfilled with any movement, changed or unchanged.

The movement adjustment may be physically placed in different locations. It may be provided in a vessel such as an Unmanned Aerial Vehicle (UAV). Alternatively it may be provided as a remote operations centre. However, it may just as well be provided in a completely different environment, such as in a cloud computing environment with which a vessel or a remote operations centre communicates.

The invention has a number of advantages. It allows adjustment of a planned movement of a wireless transceiver so that the service requirement of the associated application is fulfilled. Thereby it is possible to obtain an optimized operation based on network conditions. At the same time a cell that experiences an already heavy load may be relieved of having the load increased, which may be beneficial for the wireless network operator.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The present invention concerns the adjustment of a planned route or path for a wireless transceiver travelling through a wireless communication network, where the wireless transceiver may be provided in a vessel, such as an unmanned aerial vehicle (UAV) and set to communicate for an application having a service requirement on the wireless communication network. The application may for instance be a high-definition video capturing application that transmits high-definition video to a receiving entity via the wireless communication network. The bandwidth requirement of such an application may be high on the wireless communication network.

The wireless communication network may as an example be a mobile communication network like a Long-Term Evolution (LTE), Universal Mobile Telecommunications System (UMTS) and Global System for Mobile Communications (GSM). The invention will be described below in relation to LTE. However, since most wireless terminals today support several radio access technologies (RAT), the invention may use any of the existing RATs, such as UMTS, GSM, or CDMA2000, where CDMA is an acronym for Code Division Multiple Access. These are just a few examples of networks where the invention may be used. Another type of network where the invention may be used is a Wireless Local Area Network (WLAN) using the Institute of Electrical and Electronics Engineers (IEEE) 802.11 standard.

Figure 1:
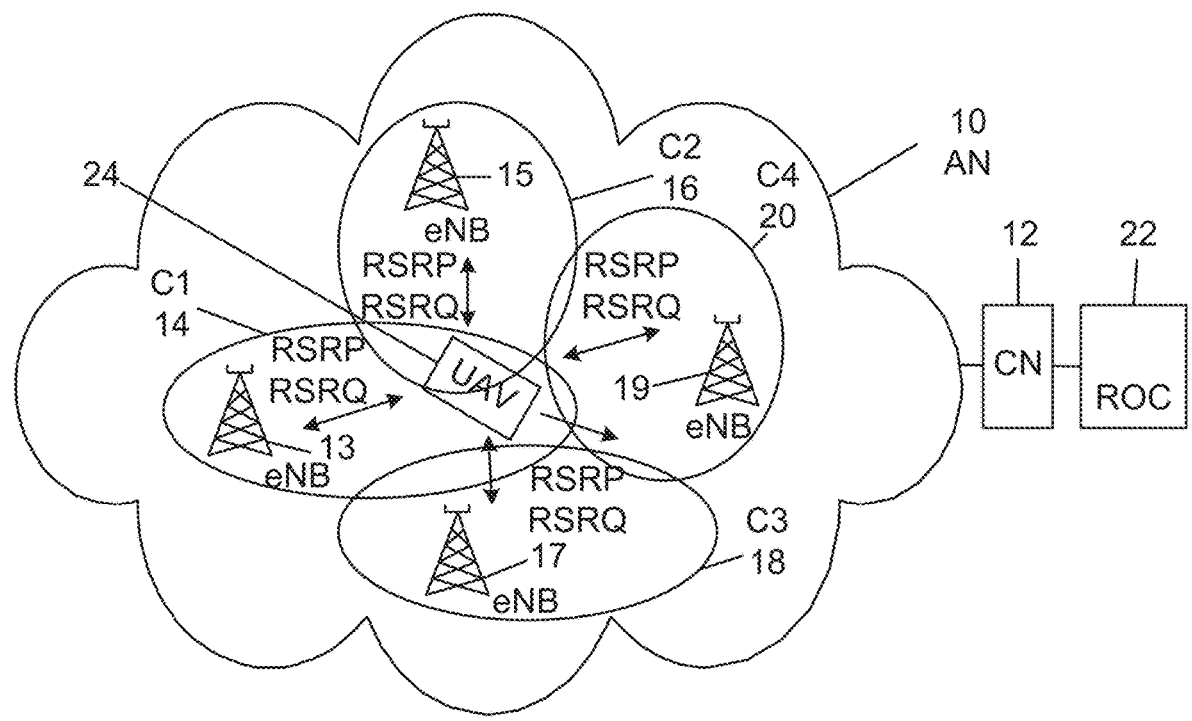
FIG. 1 schematically shows a remote operations centre connected to a wireless communication network comprising base stations in cells as well as a vessel that communicates with the base stations.

FIG. 1 schematically shows a wireless communication network which may be a network according to any of the above described types. The network may furthermore comprise an access network AN 10 and a core network CN 12, where the access network 10 comprises a first base station 13 providing coverage of a first cell C1 14, a second base station 15 providing coverage of a second cell C2 16, a third base station 17 providing coverage of a third cell C3 18 and a fourth base station 19 providing coverage of a fourth cell C4 20. It should here be realized that a base station may provide more than one cell.

In FIG. 1 there is also shown a vessel in the exemplifying form of an Unmanned Aerial Vehicle (UAV) 24. The UAV 24 is indicated as being located within the first cell C1 and set to move into the fourth cell C4, where the first cell 14 is a current cell and the fourth cell 20 a next cell according to a planned route. Furthermore, it can be seen that the UAV 24 is exchanging radio network condition data with all of the base stations, where the radio network condition data shown in FIG. 1 is in the form of radio link quality measures exemplified by Reference Signal Received Power (RSRP) and Reference Signal Received Quality (RSRQ).

Finally it can be seen that there is a remote operations centre 22 connected to the core network 12. As will become apparent later on the UAV 24 comprises a wireless transceiver that may be communicating with the remote operations centre 22 in relation to an application that is operating in the UAV 24. For this reason, the remote operations centre 22 may be responsible for assigning UAVs to various assignments, for pre-flight route planning and management & operation of UAVs in a dedicated control area, where a dedicated control area may be a physical area covered by at least a part of the wireless communication network.

Figure 2:
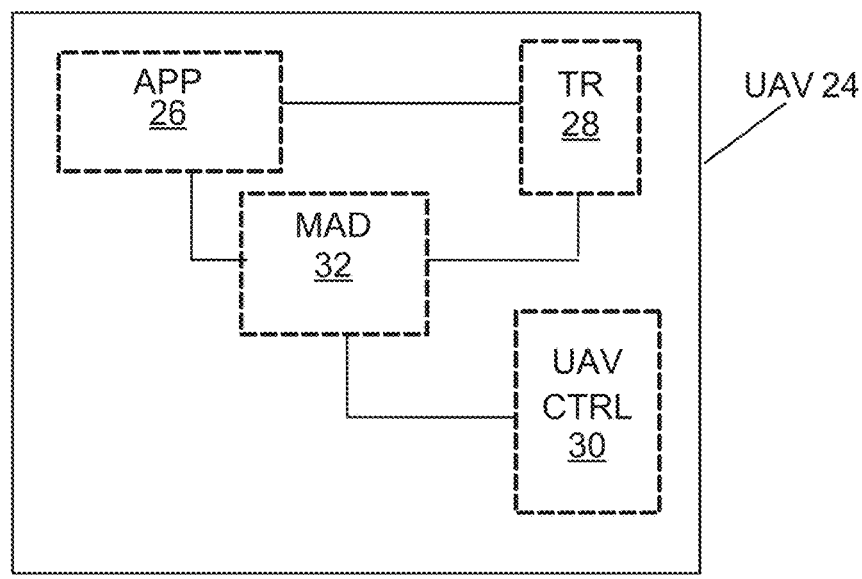
FIG. 2 shows a block schematic of some of the content of the vessel comprising an application, a wireless transceiver and a movement adjusting device.

FIG. 2 shows a block schematic of some of the content of the UAV 24. The UAV 24 comprises a wireless transceiver TR 28 set to communicate according to the wireless communication standard employed by the wireless communication network, which in this case is LTE. It also comprises an application APP 26 that provides and/or receives data from the wireless communication network via the wireless transceiver 28. One example of such data is high-definition video. Other examples of data are still images, UAV position and status data. Therefore the application 26 is connected to the wireless transceiver 28. There is also a movement adjusting device MAD 32 that may adjust the movement of the UAV 24 as well as an UAV controller UAV CTRL 30, which performs control of the UAV 24, such as control of in which direction it is to move, both vertically and horizontally as well the speed with which it is to move. For this reason the UAV controller 30 is typically connected to the throttle of an engine or to a motor of the UAV as well as to various guiding and braking elements such as flaps and brakes. The movement adjusting device 32 is provided for adjusting a planned movement of the UAV 24 based on service requirements of the application 26 on the wireless communication network and radio network condition data of the wireless network. For this reason the movement adjusting device 32 is connected to the application 26, to the wireless transceiver 28 and to the UAV controller 30.

Figure 3:
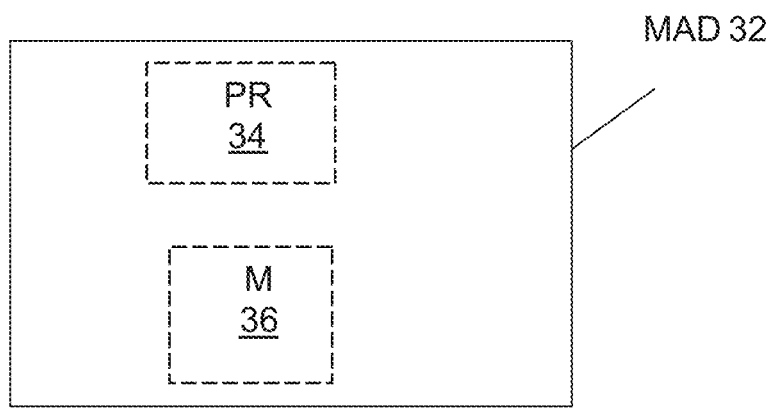
FIG. 3 shows a block schematic of a first realization of the movement adjusting device.

FIG. 3 shows a block schematic of a first way of realizing the movement adjusting device 32. It may be provided in the form of a processor PR 34 connected to a program memory M 36. The program memory 36 may comprise a number of computer instructions implementing the functionality of the movement adjusting device 32 and the processor 34 implements this functionality when acting on these instructions. It can thus be seen that the combination of processor 34 and memory 36 provides the movement adjusting device 32.

Figure 4:
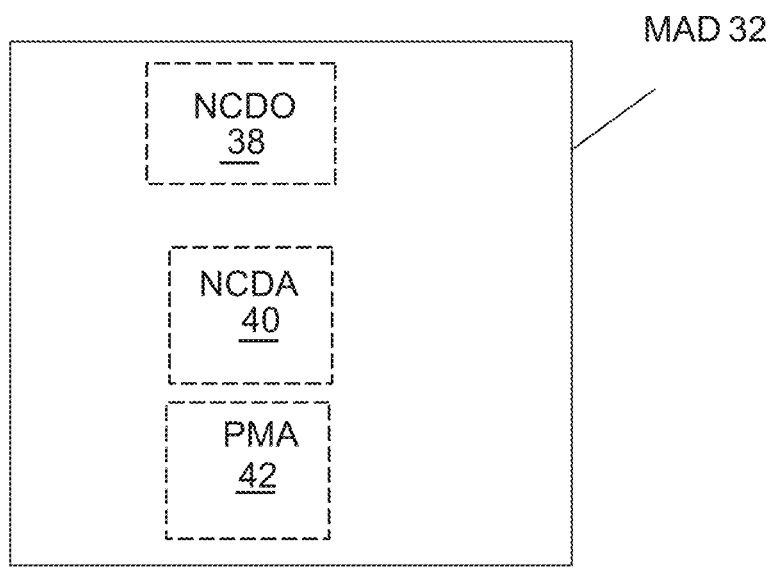
FIG. 4 shows a block schematic of a second realization of the movement adjusting device.

FIG. 4 shows a block schematic of a second way of realizing the movement adjusting device 32. The movement adjusting device 32 may comprise a network condition data obtainer NCDO 38, a network condition data analyser NCDA 4o and a planned movement adjuster PMA 42.

The elements in FIG. 4 may be provided as software blocks for instance as software blocks in a program memory, but also as a part of dedicated special purpose circuits, such as Application Specific Integrated Circuits (ASICs) and Field-Programmable Gate Arrays (FPGAs). It is also possible to combine more than one element or block in such a circuit.

As mentioned above, the UAV 24 may provide a service in relation to an application 26, which application may need to utilize the wireless communication network. In this the UAV 24 may furthermore travel along a planned route, i.e. a route that has been planned for the UAV. A communication network is not static, it is dynamic in that the ability to provide the service may vary from cell to cell and also from time to time for a cell. The ability of the network to fulfil the service requirement may thus vary and this means that if nothing is done then the application may not be able to perform as required. Furthermore, in case the application is traffic intensive and uses a cell having a high load, the ability of the cell to serve other users may also be degraded. Aspects of the invention are directed towards addressing these issues.

Figure 5:
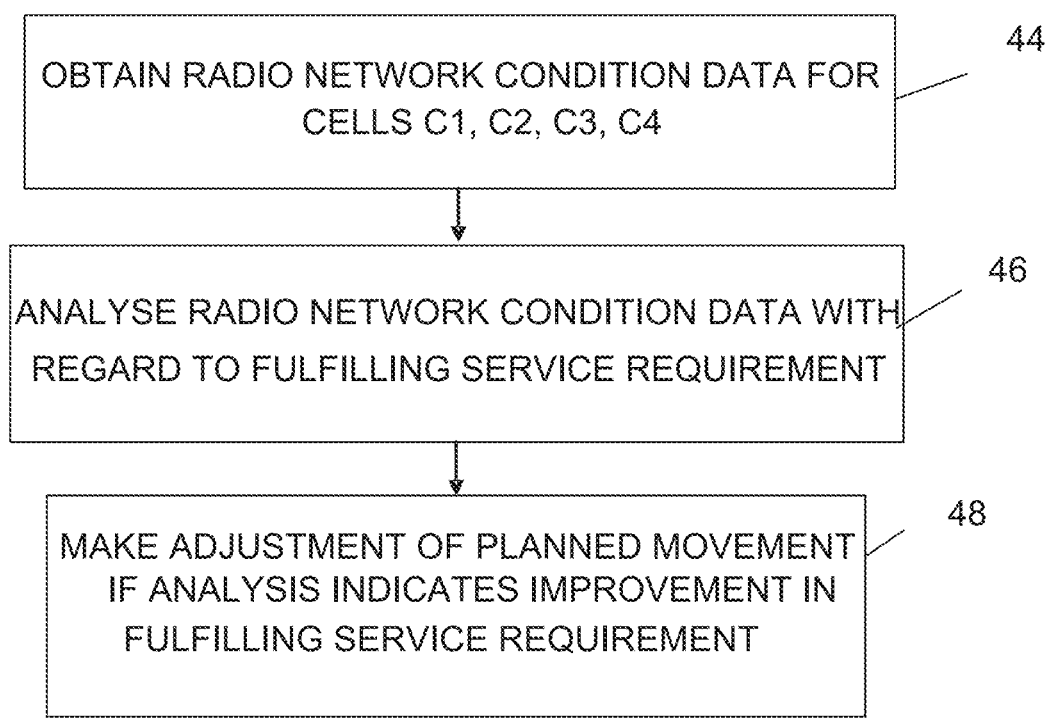
FIG. 5 shows a flow chart of a number of steps being performed in in a first embodiment of a method for adjusting the movement of the wireless transceiver.

A first embodiment will now be described with reference being made also to FIG. 5, which shows a flow chart of method steps being performed in a method of adjusting the movement of the wireless transceiver 28 according to a plan along a route through the wireless communication network, where the method steps are being performed by the movement adjusting device 32. Furthermore, the wireless transceiver 28 communicates for the application 26, which in turn has a service requirement on the wireless communication network. The operation of the application is also performed in a mission carried out by the UAV 24.

The UAV 24 may be travelling through the wireless communication network according to a plan, which plan may set out a route according to which it will pass various geographical locations as well as when it is to pass these locations. This route will thereby also define what cells of the wireless communication network the UAV is to pass as well as when it is to pass through them. The route may furthermore be pre-determined by the remote operations centre 22. During this time the network condition data obtainer 38 may obtain radio network condition data from the wireless communication network, such as from the cells of the wireless communication network, which data may comprise the above mentioned RSRP and RSRQ, which are examples of radio link quality data. However, also other data may be obtained such as physical resource block (PRB) allocations and signal to noise ratio (SINR) may be obtained from the cells. This data may be obtained continuously. However, it is as an alternative possible that the data is obtained and used at specific instances, such as if the UAV is close to a cell border, i.e. as it is close to entering the coverage area of a new cell.

The UAV may, in the example of FIG. 1, be in the coverage area of the first current cell 14 and move according to the planned route towards the fourth cell 20. When it does this the network condition data obtainer 38 may obtain radio network condition data from all the cells in its vicinity. It may thus obtain data that is indicative of the radio conditions of a cell, such as if a cell is congested or has a high load. The network condition data obtainer 38 thus obtains radio network condition data regarding a group of cells comprising a current cell in which the wireless transceiver 28 is located and a number of neighbouring cells 16, 18, 20 into which the wireless transceiver 28 may move from the current cell, step 44. In the example of FIG. 1, the radio network condition data obtainer 38 obtains data from the first, second, third and fourth cells 14, 16, 18 and 20, where this data is collected by the wireless transceiver 28. The wireless transceiver 28 may for instance collect this type of data as a part of investigating handover from the first cell 14 to any of the second, third and fourth cells 16, 18 and 2o and transfer it to the network condition data obtainer 38. The radio network condition data obtained in this way by the network condition data obtainer 38 may for instance comprise radio link quality data such as RSRP and RSRQ. The obtaining of radio network condition data performed by the network condition data obtainer 38 may also involve determining estimated cell loads based on collected radio link quality data.

The estimating of the load of the cells may involve estimation both of the load of the current cell as well as the load of the cells into which the UAV may be travelling, both according to the predetermined route as well as the cells that may be alternatives. The radio network condition data may thus comprise cell load data for at least the neighbour cells, i.e. the neighbours of the current cell. The cell loads may as an example be estimated using radio link quality data and a cell geometry measure. Alternatively the cell load may be determined based on a request for resources sent from the wireless transceiver 28 to a base station and received response to the request with the actual resource allocation, for instance physical resource block (PRB) allocations given by the cell. If for instance the request for resources is a request for a high bandwidth, such as a request for a maximum allowed bandwidth, and the granted bandwidth is low, then the cell load may be estimated to be high. After having obtained the estimated cell loads, the network condition data obtainer 38 then forwards the obtained radio network condition data to the network condition data analyser 40.

The network condition data analyser 40 analyses the radio network condition data with regard to fulfilling the service requirement of the application 26 on the communication network, step 46. The service requirement, here also denoted key performance indicator (KPI), which may set out a desired minimum delay, a required bandwidth or some other type of requirement on the wireless communication network, may be static and known in advance. This may be the case if for instance the application always has the same requirement. In other cases the requirement may be unknown or it may be dynamic, i.e. vary with time. If the requirement is known and static the network condition data analyser 40 may have knowledge of the requirement and may therefore not need to contact the application 26. However, if it is not unknown or dynamic, the network condition data analyser 40 may connect to the application 26 in order to get information about the KPI, which may thus be an unknown static value, a dynamic value or semi-dynamic value.

The analysis may involve evaluating if and in what degree the cells may succeed in fulfilling the service requirement based on the estimated cell loads. It may evaluate the cell loads defined in the cell load data with regards to fulfilling service requirement.

Typically, the higher the cell load is, the lower the probability of the wireless communication network being able to fulfil the service requirement is.

After having analysed the radio network condition data with regard to fulfilling the service requirement, which may be done through correlating the estimated cell loads with the service requirement, the network condition data analyser 40 forwards, to the planned movement adjuster 42, a prediction of if and perhaps to what degree the cells, i.e. the cell in the path and the possible alternatives, are able to fulfil the service requirement.

The planned movement adjuster 42 receives these predictions and then adjusts the planned movement so that the estimated cell load along the route after the current cell is lower after the adjustment than before the adjustment, if this is deemed to improve on the fulfillment of the service requirement, step 48. This means that if the next cell in the planned route fulfils the service requirement, then the planned movement of the UAV may remain unchanged. However, if it is unable to fulfil the service requirement, then a change in the movement is made. The change may be a change in the speed of the movement or a change in the direction of the movement. It may also be both a change of speed and direction. In order to make these changes it is possible that the planned movement adjuster 42 instructs the UAV controller 30 to make a speed and or direction change, where a change of direction may involve a change to a new next cell. A change of cell may involve a change to a cell that has a lower load than the originally planned next cell and with advantage a cell of the investigated alternatives having the lowest load. Alternatively it may be a selection of cell that has a sufficiently low load for the service requirement to be fulfilled that at the same time involves the smallest change of the planned route. A change of speed may involve a change of speed so that the UAV reaches and passes a cell along the route at a time when this cell is believed to have a load that will allow the cell to fulfil the service requirement. A change of direction may be a change in the horizontal direction, the vertical direction or in both the horizontal and vertical directions.

It can in this way be seen that it is possible to adjust the planned movement of the UAV 24 so that the service requirement is fulfilled. Thereby it is possible to obtain an optimized operation of a UAV based on network conditions. By taking network load and utilization into consideration, the UAV will achieve better prerequisites to maintain its mission KPIs. At the same time a cell that experiences an already heavy load may be relieved of having the load increased, which may be beneficial for the wireless network operator.

It can also be seen that it is possible to optimize operation of UAVs based on collection and analysis of network data such as RSRP, RSRQ and physical resource block (PRB) allocation as well as entities derived from such network data, like geometry, scheduling fraction, etc.

Figure 6:
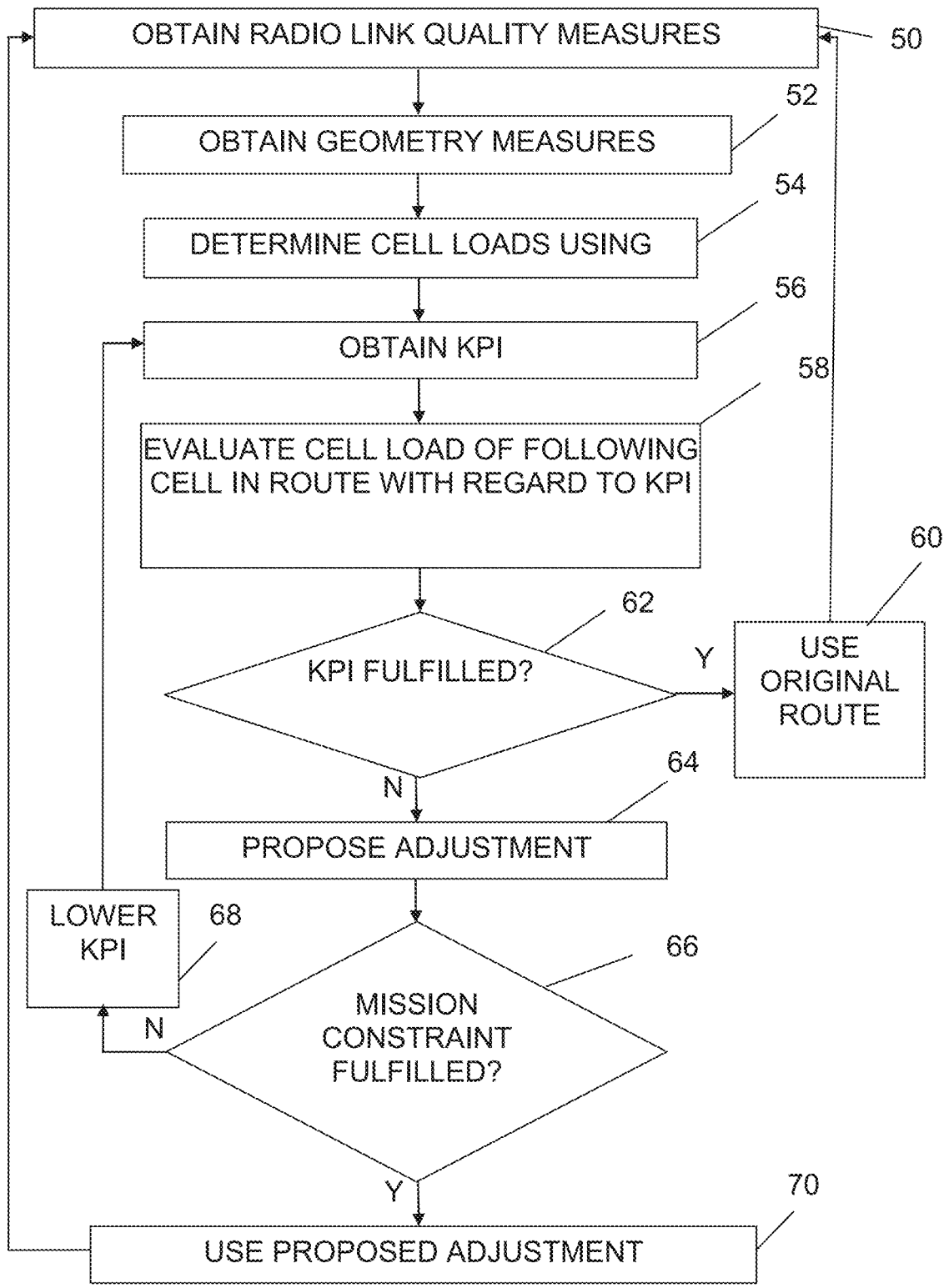
FIG. 6 shows a flow chart of a number of steps being performed in a second embodiment of the method for adjusting the movement of the wireless transceiver, FIG. 7 schematically shows an originally planned route through the wireless communication network, FIG. 8 schematically shows the originally planned route together with two proposed route adjustments.

Now a second embodiment will be described with reference being made to FIG. 6, which shows a flow chart of a number of method steps being performed in the method for adjusting the movement of the wireless transceiver 28 according to a plan along a route and also being performed by the movement adjusting device 32.

The UAV 24 may yet again be travelling through the wireless communication network according to a plan setting out a route according to which it will pass cells of the wireless communication network and may again be located in the first cell 14, which is thereby a current cell. The application 26 may again have a requirement on the wireless communication network, which as an example may be a certain bandwidth for high-definition video. During this time the network condition data obtainer 38 may obtain some radio network condition data from the wireless transceiver 28 in the form of radio link quality measures from the cells, step 50. These radio link quality measures are received both from the current cell 14 as well as from the neighbouring cells 16, 18, 20 into which the wireless transceiver 28 may be transported by the UA4 24, where the fourth cell 20 is yet again the next cell it will enter into according to the planned route. The radio link quality measures collected by the wireless transceiver 28 may for instance comprise the above mentioned RSRP and RSRQ as well as a radio link quality value, such as Signal-to-Interference and Noise Ratio (SINR). This data may also here be collected as a part of investigating possible handovers from the first cell 18 to any of the second, third and fourth cells 16, 18 and 20. Some of these values may more particularly relate to a pilot signal transmitted by the prospective destination cells. The wireless transceiver may thus detect signal strengths such as RSRP, RSRQ as well as SINR of the cells 16, 18 and 20. It is also possible that these are measured for a pilot signal also in the current cell 144. However, as the wireless transceiver 28 is communicating via the current cell 14, a number of other signals may be used for the same purposes with regard to this current cell.

The radio link quality measures are thus obtained by the network condition data obtainer 38 from the first, second, third and fourth cells 14, 16, 18 and 20, where this data was collected by the wireless transceiver 28 and transferred to the radio network condition data obtainer 38. In addition to this, the network condition data obtainer 38 also obtains a geometry measure of each of the cells, step 52.

A geometry measure of a cell may be based on a signal strength of the cell as detected by the wireless transceiver 28 divided by the sum of corresponding signal strengths of the other cells of the group. A geography measure may as an example be based on the RSRP of the cell divided by the sum of RSRPs of the other cells. The geometry measure of the fourth cell may thus be determined as the RSRP of the fourth cell 20 divided by the sum of RSRPs of the first, second and third cells 14, 16 and 18. In this way a geometry measure may be determined for all of the possible candidate cells 16, 18 and 20 that the wireless transceiver 28 may enter. It is possible, but not required that a geometry measure is determined also for the current cell 14. More information about how geometry measures may be obtained can be found in WO2012/118414, which is herein incorporated by reference.

The various values are in many cases expressed in dB. In this case it is possible that some of the operations can be performed in the logarithmic domain. However, in order to perform the summation it may be necessary to transform the dB values to the corresponding real values. This means that the individual RSRP values in dB would have to be raised using a base of 10 if they are in dB. The sum of the individual RSRP values may therefore be obtained through $10^{RSRP2/10}+10^{RSRP3/10}+10^{RSRP4/10}$. This may then be transformed back to a dB value which may subtracted from the dB value RSRP1 of the cell investigated in order to perform the division. Alternatively it is possible that the division is done using real values. The transformation of logarithmic values to real values and vice versa, is well known in the art and therefore a detailed description f these aspects have been omitted.

The network data obtainer 38 may furthermore also estimate the cell loads based on the radio link quality data and the cell geometry measure, step 54. A cell load may more particularly be determined as the cell geometry measure of a cell divided by the radio link quality value SINR of the same cell. In this way the load may be estimated for all the cells that are neighbours to the current cell, or perhaps only the neighbour cells that are possible to enter given the direction of travel of the wireless transceiver 28.

The cell load estimates are then provided as cell load data from the network condition data obtainer 38 to the network condition data analyser 40.

The network condition data analyser 40 will then analyse the radio network condition data with regard to fulfilling the service requirement or KPI of the application 26. In order to do this the network condition data analyser 40 may connect to the application 26 and be informed about the KPI, which as was stated above may be a required bandwidth, and thereby the network condition data analyser 40 obtains the KPI, step 56. Alternatively it may know of the KPI in advance. It may in this case be obtained from an internal memory. Thereafter the network condition data analyser 40 evaluates the cell load of the following or next cell in the planned route with regard to the KPI, step 58. In the present example it thus investigates the fourth cell 20. It may furthermore make the same type of evaluation for all the candidate cells. However, it is possible that such further evaluations are only made if the new cell 20 according to the planned route is determined to be unable to fulfil the KPI. The evaluation may more particularly involve an evaluation of the probability that the cell will be able to provide the required KPI given the estimated cell load. In this it may furthermore employ a quality model such as Mean Opinion Score (MOS) or Perceptual Evaluation of Video Quality (PEVQ). The use of MOS is for instance described in US 2014/0032562, which is herein incorporated by reference.

The network condition data analyser 40 then provides the results of the analysis regarding all the possible next cells, both the cell in the path and the other possible cells to the to the planned movement adjuster 42, where it is possible that no result is provided in case the new cell according to the planned router will be able to fulfil the KPI.

The planned movement adjuster 42, then investigates if the next cell in the planned route fulfils the KPI, and if it does, step 62, then the original route is used without changes, step 60, which may mean that the planned movement adjuster 42 does nothing in case the UAV controller 30 already knows the planned route. Alternatively it may instruct the UAV controller 30 to move into the next cell according to the planned route.

However, if the KPI is not fulfilled, step 62, then the planned movement adjuster 42 proposes one or more adjustments, step 64, which proposed adjustments may adjust the planned movement so that the KPI is fulfilled. The proposed adjustment may be a proposal of a new next cell, which may be another neighbour of the current cell, that has the highest probability of fulfilling the service requirements. In this it is possible to also weigh the cells based on how big a change of the path they will involve. A cell involving a smaller change in the path than another may therefore be selected even though it has a higher load than the other candidate. It is here also possible that one or more changes are proposed and if more are proposed they may be provided in an order according to how well they fulfil the KPI. The candidate cells may for instance be provided in a candidate list, where the cells are provided in the list according to a priority order.

Thereafter the planned movement adjuster 42 investigates a number of mission constraints. It is possible that the UAV 24 is powered by a battery or by an engine. It is possible that a proposed change will lead to the battery being depleted or the engine running out of fuel before reaching its destination because of the change to the movement. It is also possible that the change will introduce physical obstacles in the path.

Another constraint may be so-called geo fencing. Any of these issues may lead to an inability of the UAV to fulfil the mission constraints.

If the mission constraint is fulfilled also when there is a change in the planned movement, then the proposed adjustment is used, step 70, which may involve the planned movement adjuster 42 instruction the UAV controller 30 to change UAV settings so that the adjustment is implemented, which may involve a change in speed, a change in direction as well as a change in both direction and speed. The change in direction may in this case be a change in horizontal direction, in vertical direction as well as both in horizontal and vertical direction.

If however, the mission constraint is not fulfilled by any of the candidate changes, step 66, then the planned movement adjuster may instruct the application 26 to lower the KPI, step 68. It may for instance instruct the application 26 to use a lower bandwidth, which in the example of video may involve lowering the image resolution. Thereafter the planned movement adjuster 42 instructs the radio network condition data analyser 40 to determine new probabilities. The network condition data analyser 40 then obtains the new KPI, step 56, and again evaluates the cell loads, however in this case with regard to fulfillment of the new KPI, step 58, whereupon then planned movement adjuster 42 investigates if the new KPI is fulfilled by the original route or proposes a change in the movement, which again is compared with the mission constraint.

This will eventually lead to a movement being selected which both fulfils the KPI and the mission constraint. It can thereby be seen that the adjustment of the planned route may also be based on mission constraints of the mission in which the application is operated. A KPI may also be changed if none of the movements, changed or unchanged is able to fulfil it.

Finally after the original route has been retained, step 60, or a proposed adjustment selected, step 70, the network condition data obtainer 34 again obtains radio link quality measures, step 50, which may be done when the UAV after having entered a new cell, it again moves to a cell border, which in this case is a cell border of this new cell.

The method may thereafter be repeated in the above-described way until the UAV 24 finishes the mission, i.e. reaches its destination.

As the UAV is travelling on its route, the load estimations being determined may be stored and related to the time of day and date of the collection. The stored data may then be stored in a database of the remote operations centre 22. This data, which is thus statistics of cell load variations of the cells over time, may then be used by the remote operations centre 22 when planning a route. If all UAVs associated with the remote operations centre 22 gathers such historical data within a given control area of the remote operations centre, i.e. multiple UAV report measurement data from cells visited in the wireless communication network, then a database of network quality measures may be built. As measures are aggregated over time, it will be possible to identify hourly/daily behaviour, which can then be used to optimize performance of both UAV applications and radio network.

However, it is also possible that such statistics, i.e. statistical data, is used during flight. The statistics may for instance be used when the planned movement adjuster 42 of the movement adjusting device 32 suggests a change in movement. It is for instance possible to adjust the speed so that a cell is entered at a time at which it according to the statistics would not have a high load, which change may involve an increase of the speed or a lowering of the speed.

As can be seen in the second embodiment, the taking of mission KPIs, practical constraints as above mentioned, etc., into route planning can result in none/one/several preferred flight paths. In case zero flight paths are identified, then either it may be necessary to lower mission KPIs, reconsider set mission constraints, or even cancel the mission completely. As an alternative one can also consider the case where several UAV missions are uploaded to the remote operations centre 22, and scheduled at appropriate times in order to have all missions meet their mission KPIs if possible.

As radio network load may vary over e.g. a 24-hour period, a best-before-time for the map that corresponds to estimated route flight time (and time of the day) may be deduced. If, e.g., specific cells are found to change from "low loaded" to "highly loaded" during a UAV's flight time, such cells may be avoided in flight planning. Furthermore, in the event of several planned UAV missions, the scheduling of individual UAV missions can also be a dimension added to the optimization problem.

RSRP and SINR gathered for various cells can also be used to compile a UAV Preferred Cell (UPC) list as input to the planned movement adjuster 42. In this case, the wireless transceiver of the UAV may provide radio measures to the remote operations centre, which in turn may gather data and perform analysis of the subsets reflecting UAVs expected mission times. Either a regional UPC list can be distributed to all UAVs, or a list per individual UAV.

Figure 7:
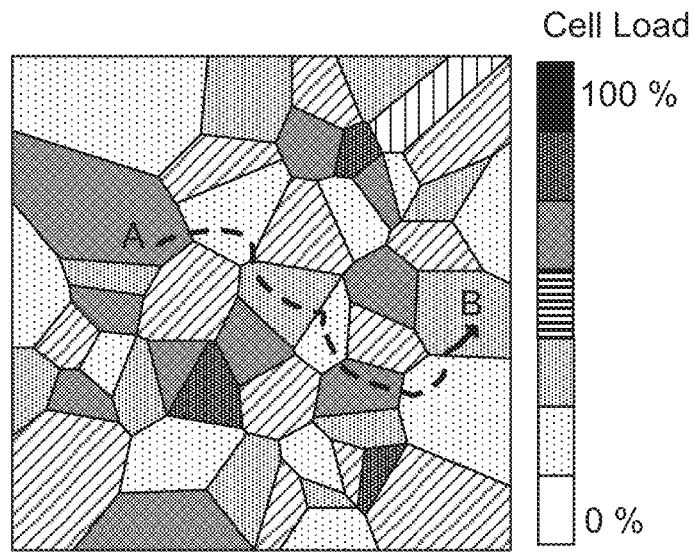

Taking network load in the context of avoiding cell overloading, a UPC list combined with other mission critical constraints can result in mission plans where a flight route is selected both fulfilling mission constraints as, e.g., battery time, mission time, etc., but also radio network KPIs in the context of avoiding cells identified as high-risk candidates for having high load during estimated mission time, as well as not congesting the traffic flow of UAV missions. An example of this is shown in FIG. 7, which shows a cell map, with a number of cells having different cell loads from 0-100%, which cell loads may be statistical cell loads. In the figure it can also be seen that the UAV is planned to move from point A to point B through a number of cells having fairly low cell loads, where the planned route is shown with a dashed line.

Figure 8:
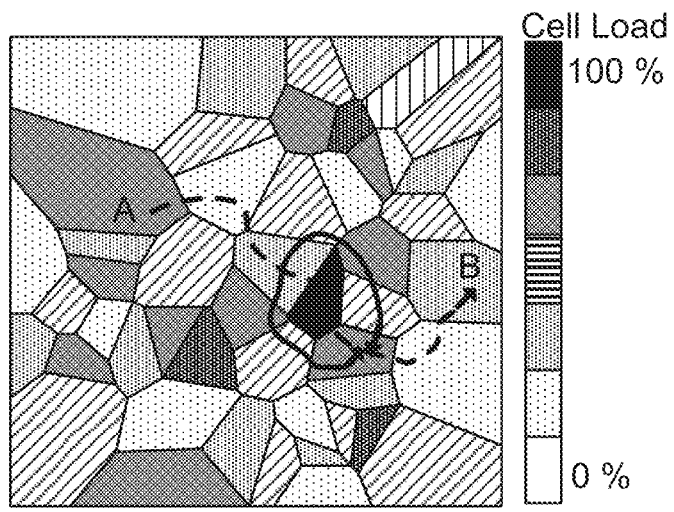

The mission maps may be planned and provided in the movement adjusting device 32. However, since the remote operations centre 22 is not limited by battery life, memory/storage, processing power, etc., it may be preferred that mission maps are planned in the remote operations centre 22 and sent to the UAVs. If the UAV 24 during its flight from A to B detects for example that a specific cell has turned from "low load" (black/dotted) to "high load" (black/dark grey), see FIG. 8, the planned movement adjuster 42 may determine alternative routes that circumvent the cell.

In FIG. 8, the dashed line again denotes the planned route of the UAV 24 for avoiding statistically known overloaded cells, while the solid lines denote alternative routes identified by the movement adjustment device 32 given the fact that a cell within pre-defined flight route emerged as "too loaded" during operation. It can be seen that two alternative routes around the cell having a too high load are suggested for the UAV.

In a further embodiment, the remote operations centre 22 can optimize its fleet of UAVs with respect to their impact on the wireless communication network; coordinate the total set of flight schedules with respect to mission task, service and duration, number of UAVs, etc.

It may furthermore be noted that with the addition of UAV missions to a radio network, the height dimension of the radio network may also be utilized in a novel way. The height or z-dimension of the network is known to differ in terms of radio network characteristics, and suitable zones on the z-dimension can also be taken advantage of, or avoided if that is better suited.

The movement adjusting device was above essentially described as being provided in the UAV 24. However, it should be realized that it may just as well be provided in the remote operations centre 22. In this case the wireless transceiver 28 of the UAV 24 may be set to send radio link quality data that it collects to the remote operations centre 22, for instance via the wireless communication network. The remote operations centre 22 may then already have knowledge of the service requirement of the application. As an alternative it may receive this information from the wireless transceiver 28. The remote operations centre 22 would then estimate cell loads and suggest possible path changes through evaluating the ability to fulfil the service requirement given the estimated cell loads and sends instructions of path changes to the UAV.

In this regard it should also be realized that the remote operations centre may in some instances be a part of the wireless communication network, in which case cell load data reported by the cells may be made available to the remote operations centre. In this case the wireless transceiver may thus not need to collect any such data.

It should also be realized that the operation of the movement adjusting device may be performed using cloud computing. Servers in a data centre may therefore receive network condition data and application KPIs and determine if a change of a route is to be made or not and then send the results to either the UAV or the remote operations centre 22.

The vessel carrying the wireless transceiver and in which the application operated, was above exemplified by a UAV. It should however be realized that the invention is not limited to this type of vessel, but may be used in relation to other types of vessels such as boats, aeroplanes, cars and trucks.

Figure 9:
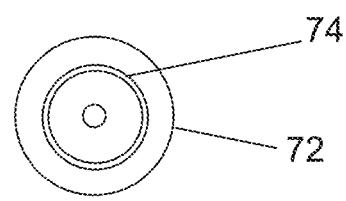
FIG. 9 shows a computer program product comprising a data carrier with computer program code for implementing functionality of the movement adjusting device.

The computer program code of a movement adjusting device may be in the form of computer program product for instance in the form of a data carrier, such as a CD ROM disc or a memory stick. In this case the data carrier carries a computer program with the computer program code, which will implement the functionality of the above-described movement adjusting device. One such data carrier 72 with computer program code 74 is schematically shown in FIG. 9.

The network condition data obtainer of the movement adjusting device may be considered to form means for obtaining radio network condition data regarding a group of cells comprising a current cell in which the wireless transceiver is located and a number of neighbouring cells into which the wireless transceiver may move. The network condition data analyser may in turn be considered to form means for analysing the radio network condition data with regard to fulfilling the service requirement of the application. Finally the planned movement adjuster may be considered to form means for making an adjustment of the planned movement if the analysis indicates that this would improve on the fulfilling of the service requirement.

The means for analysing the radio network condition data may comprise means for evaluating cell loads defined in cell load data with regard to fulfilling the service requirement and the means for making an adjustment for the planned movement may comprise means for adjusting the planned movement so that the cell load along the route after the current cell is lower after the adjustment than before the adjustment.

The means for obtaining radio network condition data may comprise means for determining cell load estimates for the neighbouring cells based on the radio link quality data and a cell geometry measure, where the cell geometry measure of a cell is based on a signal strength of the cell as detected by the wireless transceiver divided by corresponding signal strengths of the other cells of the group and the cell load estimates being provided as said cell load data The means for estimating the loads of the neighbouring cells based on responses to requests for resources sent from the wireless transceiver to the neighbouring cells and for providing the load estimations as the cell load data.

The means for making an adjustment of the planned movement may comprise means for changing the cells that the route passes.

The means for making an adjustment of the planned movement may furthermore comprise means for basing the adjustment of planned movement on mission constraints of a mission in which the application is operated.

The means for making an adjustment of the planned movement may furthermore comprise means for adjusting the speed with which the wireless transceiver moves for changing the time at which a cell is passed in the route.

The means for making an adjustment of the planned movement may also comprise means for changing the service requirement if it cannot be fulfilled with any movement, changed or unchanged.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A movement adjusting device for adjusting a movement of a wireless transceiver moving according to a planned route through a wireless communication network and communicating for an application having a service requirement on the wireless communication network, the wireless communication network comprising cells and the movement adjusting device comprising a processor acting on computer instructions whereby said movement adjusting device is operative to:
obtain radio network condition data regarding a group of cells comprising a current cell in which the wireless transceiver is located and a number of neighbouring cells into which the wireless transceiver may move;
after the wireless transceiver has moved along at least part of the planned route, determine, based on the radio network condition data, whether i) an adjustment of the planned route or ii) an adjustment of the speed at which the wireless transceiver is moving along the planned route would improve on the fulfilling of the service requirement; and
make the adjustment of the planned route or make the adjustment of the speed at which the wireless transceiver is moving as a result of determining that the adjustment would improve on the fulfilling of the service requirement, wherein
the radio network condition data comprises cell load data for at least the neighbouring cells,
the movement adjusting device when being operative to analyse the radio network condition data is operative to evaluate the cell loads defined in the cell load data with regard to fulfilling the service requirement and when being operative to adjust the planned route or speed is operative to adjust the planned route or speed so that the cell load along the route after the current cell is lower after the adjustment than before the adjustment, and
the movement adjusting device when obtaining radio network condition data is further operative to estimate the loads of the neighbouring cells based on responses to requests for resources sent from the wireless transceiver to the neighbouring cells and provide the load estimations as said cell load data.

2. The movement adjusting device of claim 1, when being operative to adjust the planned route is operative to change the cells that the route passes.

3. The movement adjusting device of claim 2, wherein the change of cells comprises a change in a vertical direction.

4. The movement adjusting device of claim 1, being further operative to base the adjustment of the planned route or the adjustment of the speed on mission constraints of a mission in which the application is operated.

5. The movement adjusting device of claim 1, wherein the radio network condition data comprises statistical cell load data.

6. The movement adjusting device of claim 1, being operative to change the time at which a cell is passed in the route by adjusting the speed of the wireless transceiver.

7. The movement adjusting device of claim 1, being further operative to change the service requirement if it cannot be fulfilled with any adjustment to the route or the speed.

8. The movement adjusting device of claim 1, wherein it is provided as a part of a vessel comprising the wireless transceiver.

9. The movement adjusting device of claim 1, wherein it is provided as a part of a remote operations centre.

10. The movement adjusting device of claim 1, wherein the movement adjusting device is configured to determine whether changing the movement of the wireless transceiver would improve on the fulfilling of the service requirement while the wireless transceiver is moving according to the planned route.

11. The movement adjusting device of claim 1, wherein the movement adjusting device is operative to determine, based on the radio network condition data, whether an adjustment of the speed at which the wireless transceiver is moving would improve on the fulfilling of the service requirement.

12. The movement adjusting device of claim 11, wherein the movement adjusting device is operative to adjust the speed of the wireless transceiver as a result of determining that the adjustment to the speed will improve on the fulfilling of the service requirement.

13. A method of adjusting the movement of a wireless transceiver moving according to a planned route through a wireless communication network and communicating for an application having a service requirement on the wireless communication network, the wireless communication network comprising cells, the method being performed in a movement adjusting device and comprising:
obtaining radio network condition data regarding a group of cells comprising a current cell in which the wireless transceiver is located and a number of neighbouring cells into which the wireless transceiver may move;
after the wireless transceiver has moved along at least part of the planned route, determine, determining, based on the radio network condition data, whether i) an adjustment of the planned route would improve on the fulfilling of the service requirement or ii) an adjustment of the speed at which the wireless transceiver is moving would improve on the fulfilling of the service requirement; and adjusting the planned route as a result of determining that that the adjustment of the planned route would improve on the fulfilling of the service requirement or adjusting the speed at which the wireless transceiver is moving as a result of determining that adjusting of the speed would improve on the fulfilling of the service requirement, wherein the obtaining of radio network condition data comprises estimating the loads of the neighbouring cells based on responses to requests for resources sent from the wireless transceiver to the neighbouring cells and providing the load estimations as said cell load data, the radio network condition data comprises cell load data for at least the neighbouring cells, and the analysing of the radio network condition data comprises evaluating the cell loads defined in the cell load data with regard to fulfilling the service requirement.

14. The method of claim 13, wherein the making of an adjustment of the planned route comprises changing the cells that the route passes.

15. The method of claim 13, further comprising basing the adjustment of planned route or speed also on mission constraints of a mission in which the application is operated.

16. The method of claim 13, wherein the radio network condition data comprises statistical cell load data.

17. The method of claim 13, comprising adjusting the speed at which the wireless transceiver is moving as a result of determining that adjusting of the speed would improve on the fulfilling of the service requirement.

18. A method of adjusting the movement of a wireless transceiver, the method comprising:
    obtaining radio network condition data regarding a group of cells comprising a current cell in which the wireless transceiver is located and a set of one or more neighbouring cells, the radio network condition data comprising cell load data for at least the neighbouring cells;
    evaluating the cell load data; and
    while the wireless transceiver is moving along a planned route:
        determining, based on the evaluation of the cell load data, that changing the velocity of the wireless transceiver would reduce cell load for one or more cells; and
        changing the velocity of the wireless transceiver as a result of determining that changing the velocity would reduce the cell load.

19. The method of claim 18, wherein
the radio network condition data comprises data concerning a radio link quality between a cell and the wireless transceiver, and
the obtaining of radio network condition data comprises determining a cell load estimate for one of the neighbouring cells.

20. The method of claim 19, wherein
determining the cell load estimate for the neighbouring cell comprises estimating the cell load for the neighbouring cell based on a response to a request for resources sent from the wireless transceiver to the neighbouring cell.

* * * * *